United States Patent [19]

Wilkins

[11] Patent Number: 4,749,925
[45] Date of Patent: Jun. 7, 1988

[54] WELL PUMP CONTROL

[76] Inventor: Earle H. Wilkins, 8608 Pigeon Pass Rd., Sunnymead, Calif. 92388

[21] Appl. No.: 587,623

[22] Filed: Mar. 8, 1984

[51] Int. Cl.⁴ ............................................. F04B 49/06
[52] U.S. Cl. ..................................... 318/482; 318/484; 417/12; 417/44
[58] Field of Search ....................... 417/12, 25, 31, 38, 417/44; 318/481, 482, 484; 200/81 R

[56] References Cited

U.S. PATENT DOCUMENTS

| | | | |
|---|---|---|---|
| 2,456,456 | 12/1948 | Smith | 417/12 |
| 2,707,440 | 3/1955 | Long et al. | 417/12 |
| 2,895,024 | 7/1959 | Brown et al. | 200/81 R X |
| 2,981,195 | 4/1961 | Payne et al. | 200/81 R X |
| 3,789,338 | 1/1974 | Szeverenyi et al. | 200/81 R X |
| 3,963,374 | 6/1976 | Sullivan | 417/12 |
| 3,963,375 | 6/1976 | Curtis | 417/38 X |
| 4,180,374 | 12/1979 | Bristow | 417/12 |
| 4,329,120 | 5/1982 | Walters | 417/38 X |
| 4,443,671 | 4/1984 | Hinds | 200/81 R X |

Primary Examiner—Bentso Ro
Attorney, Agent, or Firm—Paul H. Ware

[57] ABSTRACT

A device to control an electric well pump motor to pump continuously so long as there is liquid available to be pumped from the well. Whenever there is insufficient liquid to be pumped, the device causes shut-off of the electric pump motor. When liquid again becomes sufficiently available, the device causes pumping operations to resume. Liquid availability conditions are examined by the device at periodic intervals. The device comprises an adjustable variable-area-orifice restricted section in a liquid passage conduit, a pressure switch, a timer, an electric motor, and a motor control switch.

5 Claims, 1 Drawing Sheet

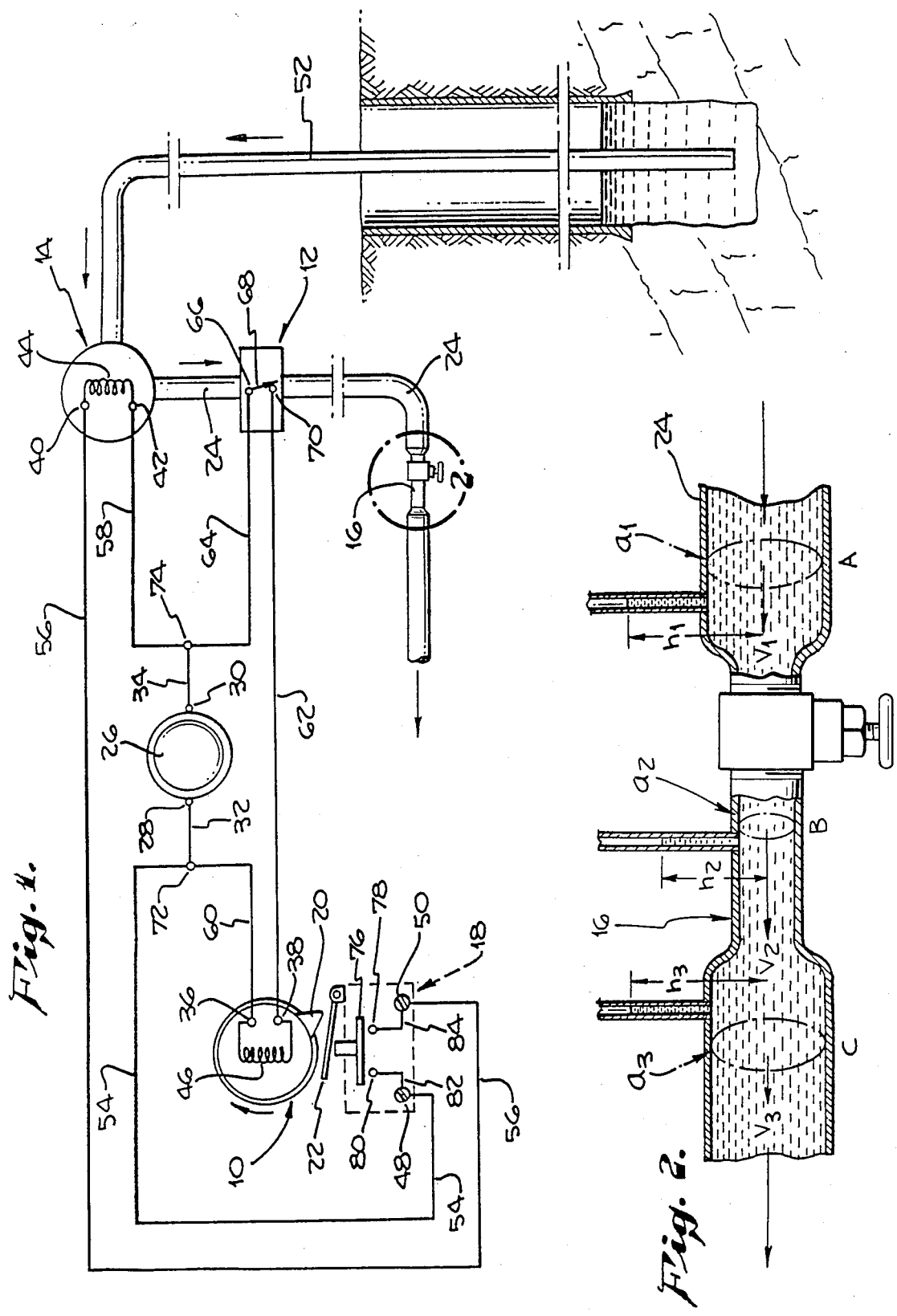

WELL PUMP CONTROL

BACKGROUND OF THE INVENTION

1. Field of the Invention

This invention relates generally to control devices for electric motors and more particularly to a device to control the operations of an electric motor-driven well pump under conditions of availability of the liquid to be pumped within the productivity limits of the well and also under conditions of the complete non-availability of the liquid to be pumped.

2. Description of the Prior Art

Pump control devices are known in which rate of flow from a pump is monitored, however, the control methods heretofore implemented have been complicated, expensive to manufacture and maintain and largely unreliable in operation. Most have incorporated a complicated arrangement of check valves, delay circuits and timing devices among other things for their operation. Many different control schemes have been employed in attempts to solve the problems presented. Most have either presented new problems or only partially solved the problems presented or both. Most of these devices have thus met special needs as presented by specific problems and have therefore served narrow purposes. These prior art devices, among other disadvantages, have failed to deliver available liquid in a well to a storage facility, have been unreliable and unpredictable in operation under continued use and have been expensive and complicated to manufacture. Some of these prior art devices have been described in the following listed patents that were brought to the attention of the applicant through a novelty search conducted in the U.S. Patent and Trademark Office.

| U.S. Pat. No. | Title | Patentee and Date | |
|---|---|---|---|
| 4,329,120 | Pump Protector Apparatus | Walters | 5/11/82 |
| 3,091,179 | Well Pumping Operation Control System | Echols, | 5/28/63 |
| 3,299,817 | Above Ground Liquid Level Control | Walters et al | 1/24/67 |
| 3,148,622 | Water System | LeVan et al | 9/15/64 |
| 4,180,374 | Well Pump Protection System | Bristow | 12/25/79 |
| 2,430,257 | Motor Control Apparatus | Teeson | 11/4/47 |
| 2,275,066 | Automatic Pump Controller | Otterbourg | 3/3/42 |
| 2,981,159 | Fluid Flow Motor Control | Payne II et al | 4/25/61 |
| 3,963,375 | Time Delayed Shut-Down Circuit for Recirculation Pump | Curtis | 6/15/76 |

It would be a great advantage to the art to provide a well pump control to apply power and to run a pump motor continuously when liquid to be pumped is sufficiently available in the well.

Another great and related advantage would be found in the provision to withhold the application of power so as to shut off the pump motor whenever liquid to be pumped is not sufficiently available in the well within the predetermined limits of productivity of the well.

A still further beneficial advantage would be realized by the provision of means to enhance pressure changes in a liquid passage flow line by the insertion of a venturi or other restriction in the liquid passage flow line.

Yet another advantage would be the provision of means to test for the existence of either a condition of availability of liquid to be pumped or non-avabilability of that liquid.

Still another related advantage would be to operate the pumping device in response to the determination of availability or non-availability of liquid.

It would further be a great advantage to provide a control system that implements all of the above recited advantages in an economical, dependable and rugged device that maintains a high level of dependability and reliability under a wide range of operating conditions.

SUMMARY OF THE INVENTION

In the implementation of the present invention, it is an object of this invention to provide a well pump control system that will run the pump motor when liquid to be pumped is available in sufficient quantity and to shut off the pump motor when that liquid is not available in sufficient quantity.

A further object is to provide a high reliability factor in the operation of the invention through enhanced pressure changes brought about by use of a variable restriction or venturi in the liquid flow line that receives the pumped liquid.

An additional object of the present invention is to provide an automatic test for conditions of either sufficient availability or non-availability in sufficient quantity of the liquid to be pumped from the well and to operate the pump motor in response to results obtained in that automatic test.

In the accomplishment of these and other objects, a well pump control is provided in which electric power may be applied to a well pump motor to cause its operation. If the liquid to be pumped is available in sufficient supply, the pumping action will cause a passage conduit to be filled with the flowing pumped liquid such that a venturi or restricted passage in that liquid passage conduit will experience a relatively low pressure due to the greater velocity of the flowing liquid in the restricted passage. The other sections of the liquid passage conduit will experience pressures that are higher in accordance with well-known physical principles. As long as this higher pressure is maintained, power will continue to be applied to the well pump motor. If now the supply of liquid in the well becomes depleted so that the liquid passage conduit cannot be adequately filled, the high pressure will drop causing electric power to be removed from the pump motor thus preventing the motor from operating a pump not under load and preventing eventual burn-out. At predetermined intervals, the well is tested for the presence of sufficient liquid. If sufficient liquid is found to be available, it will be pumped out. If it is determined that sufficient liquid is not available, another of the predetermined intervals will pass before another test of liquid sufficiency is made.

It is to be understood that the showing of the Venturi restriction in the drawing is purely for purposes of illustration and an adjustable variable-area-orifice restriction is utilized in the actual practice of the invention.

It is further to be understood that each pump-well combination will produce a different volume of liquid based on the size of the pump and the depth of the water in the well. With an adjustable variable-area-orifice restriction, the pump can be started up, a check can be made to see that the combination is producing an acceptable amount of liquid, then an adjustment can be made to the orifice until a pressure switch incorporated into the system will just barely open. A timer mechanism can be controlled by the action of this pressure switch. For example, if the well-pump combination will not supply the volume of water for which the orifice was set, the pressure switch will close, starting the timer mechanism and shutting off the pump. Without the adjustable orifice, this control is not realized; the orifice thus tends to amplify the effect of the liquid flow on the pressure switch, making the pressure switch more sensitive to changes in fluid flow.

After the orifice has been adjusted for a particular well and as long as that well's delivery characteristics or productivity limits remain the same, the orifice does not need to be adjusted again and should remain fixed at that adjustment.

For example, a well in which the liquid is 600 feet from the surface might produce 8 gallons per minute. The same well, with the liquid therein 100 feet from the surface may produce 15 gallons per minute for example. The adjustable variable-area-orifice may be adjusted so that any fluid velocity or liquid flow less than 12 gallons per minute or some other value within the productivity limits of the well will cause shutdown of the pump. Thus, the well will not be pumped down to the 600 foot level. If, at some time, it is desired to adjust the system to run at, say 8 gallons per minute, that operating level can be accomplished, however, the operating range of the system must remain within the productivity limits of the well. If the attempt is made to obtain more liquid than the well is capable of producing, the pump will pump air, pressure at the orifice will drop to zero, the pressure switch goes off and the system will not run at all until sufficient liquid, as determined by the setting of the orifice, has been collected in the well. Thus the test of sufficiency of liquid to be pumped depends on the delivery characteristics of the well and the desired volume to be pumped as determined, within the limits of productivity of the well, by the setting of the adjustable variable-area-orifice.

BRIEF DESCRIPTION OF THE DRAWINGS

Further advantages and features of the present invention will be more fully apparent to those skilled in the art to which the invention pertains from the ensuing detailed description thereof, regarded in conjunction with the accompanying drawings wherein like reference characters refer to like parts throughout and in which:

FIG. 1 is an idealized partial schematic diagram from which the operation of the well pump control may be explained.

FIG. 2 is an enlarged cross-sectional view of the restricted passage, or venturi of FIG. 1 as indicated by the sight circle.

In both drawing figures, even though, for purposes of illustration, a constant cross section restriction has been shown, actual practice of the invention will utilize an adjustable variable-area-orifice for initial set-up of the well-pump combination.

DETAILED DESCRIPTION

Although specific embodiment of the invention will now be described with reference to the drawings, it should be understood that such embodiment is by way of example only and merely illustrative of but one of the many possible specific embodiments which can represent applications of the principles of the invention. Various changes and modifications obvious to one skilled in the art to which the invention pertains, are deemed to be within the spirit, scope and contemplation of the invention as further defined in the appended claims.

Referring to FIG. 1 with greater particularity, the general theory of operation of the invention may be explained.

A pipe 52 is shown inserted into a well that has a liquid level well above the inserted end of the pipe. In the condition shown, the well pump motor 14 may continue to turn the well pump without the pump becoming dry. An entirely different situation presents itself upon the event that the liquid level in the well is below the inserted end of the pipe 52. If the well pump motor continues to turn the pump in that situation, a motor burn-out will likely occur because of the dry condition of the pump.

In many water wells, for example, in the desert regions of our country, water comes into the well in a sporadic fashion so that a level sufficient to maintain immersion of the inserted end of the pipe 52 is not always obtained. In that circumstance, it is important to have a reliable means of shutting down the pump motor so as to prevent damage to the mechanism of the pump and motor. On the other hand, it is important to be able to transport water, when it is available in sufficient quantity, to a holding or storage facility so that the water may be saved for periods of heavy use. It is important, therefore, that a system perform at least three primary functions in the satisfactory operation of a well in which the liquid supply is intermittent. First, the system must sense the availability or the lack thereof of sufficient liquid to be pumped; second, depending upon the result obtained in the first function, the system must operate or not operate the well pump; and third, the system must shut down the pump whenever the liquid supply becomes completely exhausted.

Let us assume that the well in our explanatory example is a water well and further that the level shown has been reached in a time interval $\Delta t$. Let us further assume a sporadic delivery of water into the well, therefore, there will be times when no water at all will come into the well.

In order for pumping to begin, the cam lobe 20 of rotating timer wheel 10 must cause switch actuator 22 to push down on contactor bridge 76. Electric power source 26 will then look into a completed electric circuit. Terminal 28 is connected by means of conductor 32 to junction connection point 72 then through electric line conductor 54 to motor control switch terminal 48 which is connected by means of internal switch conductor 82 and motor control switch contact 80 and contactor bridge 76 to motor control switch contact 78 which in turn is connected by means of internal switch conductor 84 to motor control switch terminal 50. Motor control switch terminal 50 is connected to means of electric line conductor 56 to well pump motor terminal 40 which connects to one end of well pump motor winding 44. The other end of well pump motor winding 44 is shown connected to well pump motor terminal 42 in turn connected through electric line conductor 58 to junction connection point 74. Junction point 74 is connected to the other electric power source terminal 30 by means of conductor 34.

It will be immediately apparent to those skilled in the art that other connection schemes may be employed to utilize pump motors of different configurations, for example, three-phase motors, etc.

With power supplied from electric power source 26 by way of well pump motor control switch 18 to the windings 44 of well pump motor 14, the pump will operate to exhaust the liquid shown in the well.

In the drawing of FIG. 1, low pressure switch 12 is shown closed. However, it is important to note that low pressure switch 12 will open under conditions of high relative pressure as determined by the setting of an adjustable variable-area-orifice, not shown, in water passage 24. In the configuration as shown, electric power source 26 looks into another completed electric circuit. Terminal 30 connects to low pressure switch terminal 66 by way of junction connection point 74 and electric conductor 64. Low pressure switch contactor 68 is shown as making contact with low pressure switch terminal 70 which connects by means of electric line conductor 62 to timer terminal 38. Timer terminal 38 is connected to one end of timer winding 46 whose other end is connected to electric power source terminal 28 by way of timer terminal 36 which is connected by electric line conductor 60 to junction connector point 72 thence through conductor 32 to terminal 28. Thus as long as low pressure switch 12 is closed, electric power will be furnished to timer winding 46; rotating timer wheel 10 will continue to rotate and well pump motor control switch 18 will be closed thus furnishing power to well pump motor 14 for as long as it takes cam lobe 20 to traverse switch actuator 22 after which time well pump motor control switch 18 will open thus removing power from well pump motor 14 for the interval of time required for rotating timer wheel 10 to complete a rotation and bring cam lobe 20 into incidence with switch actuator 22 again.

How then shall pumping be maintained for the condition that there is sufficient liquid in the well to be pumped?

Let us refer to FIG. 2 for the moment. There liquid passage 24 has been shown with a restriction or venturi 16. This section of liquid passage 24 is an enlargement from FIG. 1 as shown by the sight circle 2. Even though, for purposes of illustration and explanation, a restriction of constant cross section has been shown, an adjustable restriction in the form of a gate valve, for example, or other form of variable-orifice device, well known in the art may be used in this application. A liquid is illustrated as flowing in the direction of the arrows in the passage. With very little error, we may assume that the liquid is incompressible and that the test probes shown in each section of the pipe cause no appreciable perturbations. The sections of the pipe are labeled A, B and C as shown having cross-sections $a_1$, $a_2$ and $a_3$ respectively. In the steady state, the amount of liquid which passes A must be the same as that which passes B per unit time and the same is true for C. If $v_1$, $v_2$ and $v_3$ denote the velocities of the flowing liquid at A, B and C respectively, and d the density of the liquid, then $$v_1 a_1 dt = v_2 a_2 dt = v_3 a_3 dt$$

represents the amount of liquid passing at each cross-sectional portion of the pipe 24. Of course since d and t are the same for all portions we immediately have $$v_1 a_1 = v_2 a_2 = v_3 a_3.$$

It is immediately apparent that at B where $a_2$ is smaller than $a_1$ we must have $v_2$ greater than $v_1$. Also, if at C we have $a_3$ equal to $a_1$ then it follows that we must have $$v_3 = v_1.$$

Upon further consideration, if we now observe that the liquid flowing in the pipe must have been accelerated in going from A to B since the velocity $v_2$ is greater than $v_1$ there must be a difference in pressure (force per unit area) acting on liquid particles travelling from A to B. Since the acceleration is in the direction A to B, the higher pressure apparently is at A. In steady-state liquid flow, therefore, the pressure is greatest where the velocity is least, or to state the converse, the pressure is least where the velocity is greatest. The foregoing is the physical basis for Bernoulli's theorem which may be stated for exemplary purposes as:

"At any two points along a streamline in an ideal fluid in steady flow, the sum of the pressure, the potential energy per unit volume, and the kinetic energy per unit volume has the same value." (1)

(1) College Physics-Wever, White, Manning-McGraw Hill 1959-p. 155.

It is apparent that water flow through a constricted pipe will result in a speed-up of the water as it enters the constriction, thus, there will be a speed-up of the pumped liquid as it travels from A having cross-section $a_1$ into B having cross-section $a_2$ resulting in a decrease in pressure at $a_2$ or what is the same thing, a higher pressure at A than at B. By the same reasoning, the pressure will also be higher at C. These higher pressures are illustrated by the higher levels from the center of the pipe, $h_1$ and $h_3$ being higher than $h_2$ at the constriction. Thus, as long as a steady-state flow of liquid can be maintained in the pipe 24 through its constriction 16, a higher pressure will be obtained at other points of the pipe than at the constriction.

Of greater immediate importance to the present invention, we also have:

$$v_1 a_1 = v_2 a_2$$

and immediately:

$$v_2 = (a_1/a_2) v_1$$

From the statement of Bernoulli's theorem we may write $$\sum_{i=1}^{n} p_i \frac{m_i}{\rho_i} + \tfrac{1}{2} m_i v_i^2 + m_i g h_i = K_1$$

$$\frac{m^2}{\rho} = 1$$

where p denotes the pressure energy;
$\tfrac{1}{2}mv^2$ denotes the kinetic energy; and
mgh denotes the potential energy.

The $h_i$ here are not the $h_1$, $h_2$, or $h_3$ of FIG. 2.

The defining equation may be rewritten as:

$$\sum_{i=1}^{n} p_i + \tfrac{1}{2}\rho_i v_i^2 + \rho_i g h_i = K_2$$

For purposes of our analysis, the conduit may be assumed level so that the $h_i$ are equal; the liquid may be assumed to be incompressible so that the $\rho_i$ are equal. Thus for two sections of the conduit of different cross section, we have:

$$p_1 + \tfrac{1}{2}\rho_1 v_1^2 + \rho_1 g h_1 = p_2 + \tfrac{1}{2}\rho_2 v_2^2 + \rho_2 g h_2$$

and since $\rho_1=\rho_2$ and $h_1=h_2$ $$p_1+\tfrac{1}{2}\rho v_1^2=p_2+\tfrac{1}{2}\rho v_2^2$$

With no loss of generality we can take $\rho=1$ and write $$p_1+\tfrac{1}{2}v_1^2=p_2+\tfrac{1}{2}v_2^2$$

so that $$p_1-p_2=\tfrac{1}{2}(v_2^2-v_1^2)$$

but we also have $$v_2=(a_1/a_2)v_1$$

so that finally $$P=p_1-p_2=[(a_1^2/a_2^2)-1](v_1^2/2)$$

which states that in two sections of a conduit of different cross sections, the pressure differential is proportional to the ratios of the different cross sections and to the square of the fluid velocity in one of the sections. Conversely, then, control of that ratio of cross sections will control the pressure differential and thus control the operating point of a properly connected pressure switch. It is also evident that control of the fluid velocity will affect the pressure relationship.

It is instructive to examine extremes as related to the operative relationship.

First, if there is no restriction or constriction in the conduit, we will have $a_1=a_2$ and if we neglect friction, $$P=p_1-p_2=0$$

and there will be no differential pressure other than that resulting from fluid friction, which may be ignored for our purposes.

It is thus apparent that the control system of the present invention cannot be realized without a constriction or restriction in the conduit. Since the implementation of the present invention requires a restriction, we will not have either $a_1=a_2$ or $a_1<a_2$.

If we consider the further extreme wherein $a_2=0$, that is, where the adjustable variable-area-orifice is completely closed, we have the unacceptable result of division by zero, however, we can consider the ratio $a_1^2/a_2^2$ as $a_2$ tends to zero. The ratio increases without bound and the pressure becomes very large, tending to infinity.

It is thus apparent that we can control the value of the pressure by control of the area of the orifice denoted by $z_2$ from values approaching zero pressure to very large values approaching infinity. Thus, we may minutely control the pressure operating point of switch 12 by controlling an adjustable variable-area-orifice. When appropriate conditions of pressure as controlled by adjustment of an adjustable variable-area-orifice are attained, also as affected by fluid velocity in the sections of the conduit, switch 12 will close or open so as to drive or shut down the well pump motor. If there is a sufficient amount of liquid to be pumped from the well, conditions of pressure and fluid velocity or fluid flow will cause switch 12 to remain open thus removing power from the timer so as to stop the timer wheel 10 in its traverse across switch actuator 22 so that continuous power will be supplied to drive the pump motor.

It is now advantageous to consider the operation of the Well Pump Control under some of the conditions to be encountered.

I—Sufficient Liquid to be Pumped Available in the Well

This is the situation as illustrated in FIG. 1 just prior to turn-on of the well pump motor 14. Low pressure switch 12 is in the closed condition thus rotating timer wheel 10 is being driven in the direction indicated by the arrow so as to bring cam lobe 20 into operating contact with switch actuator 22. When switch actuator 22 is pushed down far enough by cam lobe 20, well pump motor control switch 18 will be closed and power will be supplied to well pump motor 14. Since it takes the cam lobe 20 a finite amount of time to complete its traverse of switch actuator 22 power will be supplied to well pump motor 14 for that finite amount of time in any case. However, since liquid is available in the well in sufficient supply, other activities predominate.

First the pumping action initiated by the well pump motor will cause pipe 52 to be filled and a steady-state flow begun through liquid passage conduit 24. The steady-state flow will result in an enhanced pressure in the parts of the conduit upstream and downstream of the constriction 16. This pressure, seen by pressure switch 12, will cause that switch to open thus removing power from timer winding 46. Rotating timer wheel 10 will stop with cam lobe 20 still holding switch actuator 22 so as to maintain closure of well pump motor control switch 18. However, this condition will obtain only for so long as steady-state flow is maintained in conduit 24 so as to maintain the pressure environment required to keep switch 12 open.

II-Liquid Exhausted from the Well

When the liquid has been exhausted from the well and not enough liquid has come into the well so that steady-state flow can be maintained in conduit 24 in accordance with the adjustment of the adjustable variable-area-orifice restriction, not shown, the pressure will drop in the conduit so that this lower pressure seen by pressure switch 12 will now allow that switch to close. Closure of switch 12 once more will apply power to timer winding 46 so as to drive rotating timer wheel 10 in the direction of the arrow and out of contact with switch actuator 22. Well pump motor control switch 18 will now open thereby removing electric power from well pump motor winding 44 and stopping well pump motor 14.

The rotating timer wheel 10, will continue to rotate for a time $\Delta t$ which in our example is about the time it takes to make a complete revolution. Rotating and other kinds of timers are well known in the art that may be set up commonly for periods of hours, or days so that the time interval $\Delta t$ may be chosen in relationship to the average productivity of the wall employing the invention.

When the time $\Delta t$ has elapsed, the rotating timer wheel 10 will once again cause the cam lobe 20 to operate switch actuator 22 so as to close well pump motor control switch 18. If, during the time $\Delta t$, there has not been sufficient accumulation of liquid in the well, the pump motor 14 will run only as long as it takes the cam lobe 20 to traverse the switch actuator 22 after which time the pump motor will be shut down for another period, $\Delta t$.

If, on the other hand, there has been a sufficient accumulation of liquid in the well during the time $\Delta t$, the system will perform the operations first described in I above.

Thus the inventive device here described will pump liquid from a well as long as that liquid is sufficiently available; will shut down the pumping operation when that liquid becomes unavailable and will test the well for the sufficient availability of liquid at every $\Delta t$ time interval. It should be apparent that pumping operations may be scheduled in accordance with an experimentally determined average productivity of a well for maximum efficiency of the pumping operation and without the danger of pump burn-out caused by excessive operation of a dry pump.

Thus, there has been described a well pump control that fulfills the stated objects of the invention. Great improvements in reliability, flexibility, maintainability, ease of operation, safety, economy, and efficiency have been provided through the novel advantages of the invention.

It is pointed out that although the present invention has been shown and described with reference to a particular embodiment, nevertheless various changes and modifications, obvious to one skilled in the art to which the invention pertains, are deemed to lie within the purview of the invention.

What is claimed and desired to be secured by Letters Patent of the United States is:

1. Apparatus for controlling the application of electric power to a well pump motor in accordance with the productivity limits of a well as determined by the availability of a sufficient quantity of liquid to be pumped from the well, comprising:
    a liquid passage conduit;
    an adjustable variable-area-orifice restricted section in said liquid passage conduit;
    a pressure switch responsive to conditions of pressure in said liquid passage conduit and said adjustable variable-area-orifice restricted section thereof, said conditions of pressure being directly related to the ratio of the cross sections of said liquid passage conduit and said adjustable variable-area-orifice thereof and to the fluid velocity in said liquid passage conduit whereby said conditions of pressure may be set by adjusting said adjustable variable-area-orifice;
    a timer responsive to said pressure switch so that the timer will continue to operate as long as said pressure switch is closed, responsive to said conditions of pressure and fluid flow;
    an electric motor control switch responsive to said timer so that the electric motor control switch will be closed for at least one condition of said timer so as to drive said well pump motor.

2. The apparatus of claim 1 wherein said pressure switch will assume and maintain a closed configuration for conditions of relative low pressure as determined by said ratio of the cross sections of said liquid passage conduit and said adjustable variable-area-orifice restricted section therein and by said fluid velocity in said liquid passage conduit.

3. The apparatus of claim 1 wherein said pressure switch will assume and maintain an open configuration for conditions of relative high pressure as determined by said ratio of the cross sections of said liquid passage conduit and said adjustable variable-area-orifice restricted section therein and by said fluid velocity in said liquid passage conduit.

4. The apparatus of claim 3 wherein said relative high pressure will be maintained by the operation of the well pump motor when said liquid to be pumped is available in sufficient quantity as determined by said ratio and said fluid velocity.

5. A method, employing a timer, a source of electric power and a well pump motor control switch for controlling an electric pump motor for a well in accordance with the productivity limits of that well, wherein a pipe from the well is connected to a water passage conduit, comprising the steps of:
    inserting an adjustable variable-area-orifice restriction in said water passage conduit;
    adjusting said variable-area orifice in accordance with the productivity limits of the well so as to select a desired rate of fluid flow within said limits;
    connecting a pressure switch responsive to conditions set up by adjustment of said adjustable orifice;
    connecting said timer to said pressure switch and said electric power source so that the operation of the timer is controlled by said pressure switch;
    operating said well pump motor control switch by said timer so as to control application of electric power from said electric power source to said well pump motor.

* * * * *